US012669436B2

(12) United States Patent
Zhang

(10) Patent No.: US 12,669,436 B2
(45) Date of Patent: Jun. 30, 2026

(54) VERSATILE MULTIMODAL OPTICAL MODALITY BASED ON BRILLOUIN LIGHT SCATTERING AND PHOTOACOUSTIC EFFECT

(71) Applicant: Wayne State University, Detroit, MI (US)

(72) Inventor: Jitao Zhang, Troy, MI (US)

(73) Assignee: Wayne State University, Detroit, MI (US)

( * ) Notice: Subject to any disclaimer, the term of this patent is extended or adjusted under 35 U.S.C. 154(b) by 61 days.

(21) Appl. No.: 18/440,471

(22) Filed: Feb. 13, 2024

(65) Prior Publication Data

US 2024/0272073 A1 Aug. 15, 2024

Related U.S. Application Data

(60) Provisional application No. 63/445,198, filed on Feb. 13, 2023.

(51) Int. Cl.
*G01N 21/63* (2006.01)
*G01N 21/21* (2006.01)
(Continued)

(52) U.S. Cl.
CPC ........... *G01N 21/636* (2013.01); *G01N 21/21* (2013.01); *G01N 29/02* (2013.01);
(Continued)

(58) Field of Classification Search
CPC ...... G01N 21/636; G01N 21/21; G01N 29/02; G01N 29/2425; G01N 2021/638;
(Continued)

(56) References Cited

U.S. PATENT DOCUMENTS 12,019,018 B2 * 6/2024 Scarcelli .............. G01N 21/636
12,209,909 B2 * 1/2025 Yun ........................ H01S 3/108
(Continued)

FOREIGN PATENT DOCUMENTS

WO WO-2016033199 A1 * 3/2016 .......... G01B 11/161

OTHER PUBLICATIONS

Shi, "A versatile multimodal optical modality based on Brillouin light scattering and photoacoustic effect," BioarXiv; Article [online], 2023, 4 pgs. (retrieved from https://www.biorxiv.org/content/biorxiv/early/2023/03/12/2023.03.10.532144.full.pdf.
(Continued)

*Primary Examiner* — Isiaka O Akanbi
(74) *Attorney, Agent, or Firm* — Brooks Kushman P.C.

(57) ABSTRACT

A multimodal optical technique that can measure the mechanical, optical, and acoustical properties of the sample at microscopic resolution, which is based on the integration of a Brillouin microscope and a photoacoustic (PA) microscopy is provided. The multimodal technique not only can acquire co-registered Brillouin and PA signals of the sample but also allows us to utilize the sound speed measurements by PA to quantify the sample's refractive index, which is an essential property of the material and cannot be measured by either technique individually. We demonstrated the colocalization of Brillouin and time-resolved PA signals by measuring the interface of kerosene and 1% CuSO4 aqueous solution. In addition, we measured the refractive index of saline solutions with a precision of 0.003 and validated the result against published data. This multimodal modality could open new way for charactering biological cell and tissue in physiological and pathological conditions.

16 Claims, 5 Drawing Sheets

(51) Int. Cl.
    *G01N 29/02*       (2006.01)
    *G01N 29/24*       (2006.01)

(52) U.S. Cl.
    CPC ... *G01N 29/2425* (2013.01); *G01N 2021/638*
        (2013.01); *G01N 2291/02466* (2013.01)

(58) Field of Classification Search
    CPC ..... G01N 2291/02466; G01N 21/1702; G01N
                           29/2418
    USPC ..................................... 356/72–73, 301, 326
    See application file for complete search history.

(56)              References Cited

U.S. PATENT DOCUMENTS 12,326,366 B2 *   6/2025   Shi ......................... G01N 21/47

| | | | |
|---|---|---|---|
| 2009/0323056 A1 * | 12/2009 | Yun | ........................... G01J 3/26 |
| | | | 356/326 |
| 2013/0308956 A1 * | 11/2013 | Meyers | ................. H04B 10/70 |
| | | | 977/933 |
| 2017/0176318 A1 * | 6/2017 | Scarcelli | .............. G01N 15/147 |
| 2017/0254749 A1 * | 9/2017 | Yun | ...................... A61B 5/0095 |
| 2018/0188173 A1 * | 7/2018 | Scarcelli | ........... G01N 15/1429 |
| 2018/0297117 A1 * | 10/2018 | Kanko | ................. B23K 31/125 |
| 2020/0355554 A1 * | 11/2020 | Scarcelli | .............. G01N 21/359 |
| 2022/0042908 A1 * | 2/2022 | Scarcelli | .............. G01N 21/636 |
| 2022/0326080 A1 * | 10/2022 | Yun | ........................ H01S 3/108 |

OTHER PUBLICATIONS

International Search Report and Written Opinion dated Jun. 10, 2024 for PCT Appn. No. PCT/US24/15564, 9 pgs.

* cited by examiner (a) Hydrophone (b)

VERSATILE MULTIMODAL OPTICAL MODALITY BASED ON BRILLOUIN LIGHT SCATTERING AND PHOTOACOUSTIC EFFECT

CROSS-REFERENCE TO RELATED APPLICATIONS

This application claims the benefit of U.S. provisional application Ser. No. 63/445,198 filed Feb. 13, 2023, the disclosure of which is hereby incorporated in its entirety by reference herein.

STATEMENT REGARDING FEDERALLY SPONSORED RESEARCH OR DEVELOPMENT

The invention was made with Government support under Contract No. K25HD097288; awarded by the National Institutes of Health. The Government has certain rights to the invention.

TECHNICAL FIELD

In at least one aspect, the present invention relates to multimodal imaging devices for determining the mechanical, optical, and acoustical properties of a sample, and in particular, a biological sample.

BACKGROUND

Photoacoustic (PA) imaging is a rapidly growing modality in biomedical research due to its ability to acquire high-contrast functional images up to several centimeters in biological samples [1-3]. In PA imaging, the absorption of light energy (short laser pulses) by chromophores (endogenous or exogenous) generates acoustic waves that are induced by an internal thermoelastic expansion [1]. The consequent acoustic waves can be probed by acoustic detectors such as an ultrasound transducer or a hydrophone to form PA images. The amplitude of the detected PA signal represents the optical absorption and scattering of the sample. In addition, the speed of sound (SOS) can be obtained by calculating the time-of-flight (TOF) of the PA signal, with a priori knowledge of the physical distance between the detector and the location of the incident beam spot.

Confocal Brillouin microscopy is an emerging optical modality for quantifying the mechanical properties of materials with a diffraction-limit resolution [4-7]. The principle of Brillouin microscopy is based on spontaneous Brillouin scattering, where the interaction of incoming light and the inherent acoustic wave within the sample introduces a frequency shift (i.e., Brillouin shift $\omega_B$) to the scattered light. The Brillouin shift at 90° geometry is physically determined by $\omega_B = \sqrt{2}n/\lambda \cdot \sqrt{M'/\rho}$, with $\lambda$ of the laser wavelength, n of the refractive index, $\rho$ of the density, and M' of the elastic longitudinal modulus. With known refractive index and density of the sample, the mechanical properties can be directly assessed with the Brillouin shift measured by a Brillouin spectrometer [8].

In the past 15 years, Brillouin microscope has been demonstrated for non-invasive mechanical imaging of cells and tissues, indicating its promising applications in ocular diseases, cancer metastasis, cellular biomechanics, and developmental biology [9-12]. Currently, the Brillouin microscope mostly uses the Brillouin shift to estimate the relative change of longitudinal modulus with the assumption that the ratio of refractive index and density $n/\sqrt{\rho}$ is approximately constant in many physiological processes [5, 13-17]. However, for direct and accurate quantification of longitudinal modulus, measurement of the refractive index and density by other methods is required. Since the density of many biological materials can be calculated from the refractive index based on a two-substance mixture model [18-20], colocalized measurement of refractive index and Brillouin shift will allow the direct quantification of longitudinal modulus. Very recently, dual-geometry Brillouin microscopy [21] and a multimodal modality that combines Brillouin microscopy with optical diffraction tomography [22] have been demonstrated for such purpose.

SUMMARY

In at least one aspect, a multimodal optical modality by combining a PA microscopic imaging system with a Brillouin microscope is provided. In this modality, two laser beams were coupled into a common optical path for collecting the Brillouin and time-resolved PA signals from the same spot simultaneously. Therefore, this new modality allows us to acquire the colocalized optical, acoustic, and mechanical properties of the material for comprehensive characterization. Intriguingly, using the SOS ($V_{SOS}$) measured by the PA signal, we can directly quantify the refractive index from the measured Brillouin shift based on the relationship of $V_{SOS} = \sqrt{M'/\rho} = \omega_B \lambda/\sqrt{2}n$, which further allows us to derive the longitudinal modulus based on the two-substance mixture model. It is worth highlighting that, this additional information can only be obtained by the integrated system but not by Brillouin or PA modality individually.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
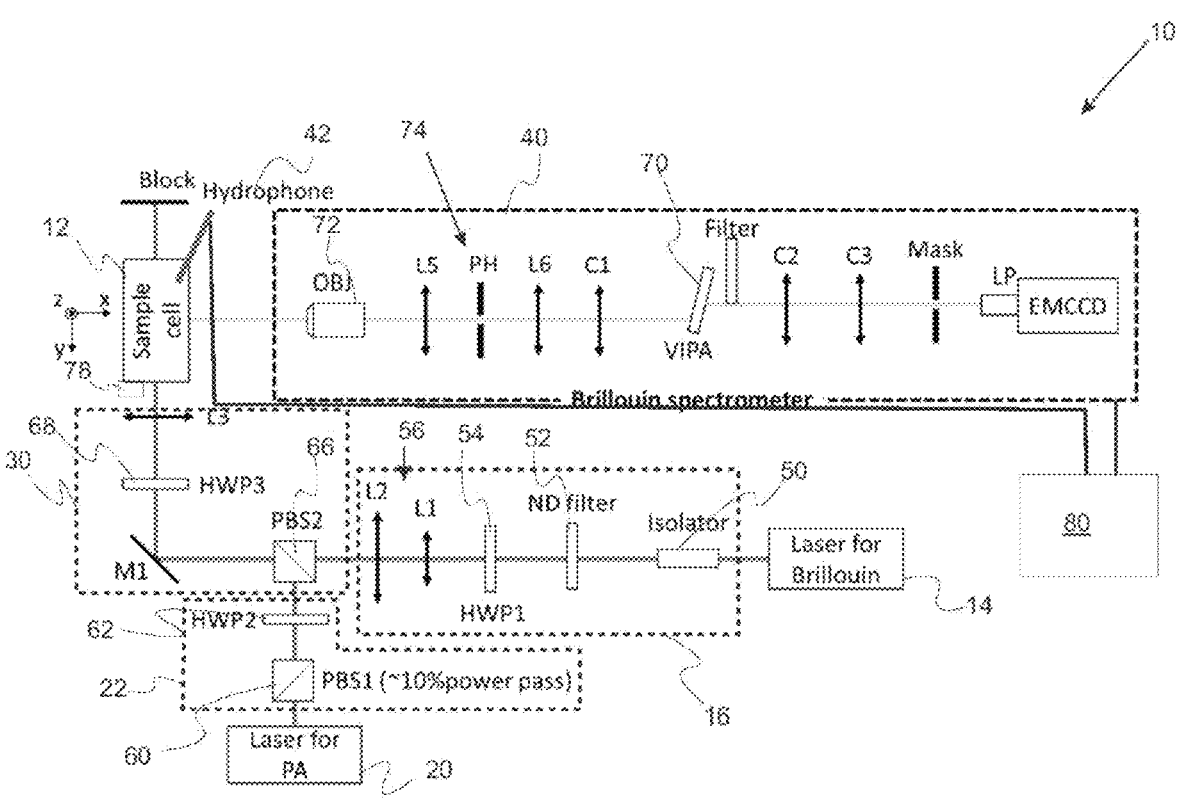
FIG. 1. The schematic of the multimodal modality based on Brillouin and PA imaging. (HWP1-HWP3: half-wave plates; PBS1-PBS2: polarized beam splitter; L1-L5: lenses; OBJ: objective; PH: pin hole; C1-C3: cylindrical lenses; LP: lens pair).

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time. The term "computing device" refers generally to any device that can perform at least one function, including communicating with another computing device. In a refinement, a computing device includes a central processing unit that can execute program steps and memory for storing data and a program code.

When a computing device is described as performing an action or method step, it is understood that the one or more computing devices are operable to perform the action or method step typically by executing one or more lines of source code. The actions or method steps can be encoded onto non-transitory memory (e.g., hard drives, optical drive, flash drives, and the like).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

Throughout this application, where publications are referenced, the disclosures of these publications in their entireties are hereby incorporated by reference into this application to more fully describe the state of the art to which this invention pertains.

Abbreviations

"CW" means continuous-wave.
"HWP" means halfwave plate.
"PA" means Photoacoustic.
"PBS" means polarized beam splitter.
"SOS" means speed of sound.
"TOF" means time-of-flight.
"VIPA" means virtually-imaged phased array.

Referring to FIG. 1, a schematic of a multimodal optical apparatus for imaging a sample to provide comprehensive mechanical properties is provided. Multimodal optical apparatus 10 includes a sample cell 12 that holds the sample to be analyzed. Advantageously, the sample can be a biological sample such as a tissue specimen. First light source 14 provides a Brillouin light beam to the sample for Brillouin scattering. In a refinement, the first light source is a continuous wave laser. First optical system 16 directing and modifies the Brillouin light beam. Characteristically, the first optical system provides p-polarized light beam to the sample. Multimodal optical apparatus 10 further includes a second light source 20 for providing a photoacoustic light beam to the sample for photoacoustic excitation and a second optical system 22 for directing and modifying the photoacoustic light beam. In a refinement, the second light source is a tunable pulsed laser. The second optical system 22 provides s-polarized light beam to the sample. Multimodal optical apparatus 10 further includes third optical system 30 for coupling the Brillouin light beam to the photoacoustic light beam as a coupled light beam after the first optical system and the second optical system. The third optical system 30 directs the coupled light beam to the sample. Brillouin spectrometer 40 collects Brillouin signals generated from the sample. In a refinement, the Brillouin spectrometer collects the Brillouin signal at a 90° geometry. An acoustic detector 42 detects a photoacoustic signal generated from the sample. In a refinement, the acoustic detector is a hydrophone or a microphone.

In a variation, the first optical system 16 includes an isolator 50 to reject back-reflection and a variable neutral density filter 52 adjusting output power of the first light source. First optical system 16 also includes halfwave plate 54 (HWP1) for adjusting polarization state of the Brillouin light beam to be p-polarized. In a refinement, first optical system 16 can also include a lens system 56 for expanding the Brillouin light beam. In a further refinement, lens system includes a pair of lenses.

In a variation, second optical system 22 includes a polarized beam splitter (PBS1) 60 to obtain the linearly polarized beam (e.g., a p-polarized beam) and a half-wave plate (HWP2) 62 for adjusting polarization orientation of the photoacoustic light beam to s-polarization.

In a variation, third optical system 30 includes a polarized beam splitter (PBS2) 66 that couples the Brillouin light beam to the photoacoustic light beam. In a refinement, third optical system 30 further includes a half-wave plate (HWP3) 68 to further adjust the Brillouin light beam and PA beam to s-polarized and p-polarized, respectively. In a further refinement, the third optical system includes a mirror M1 for directing the coupled light beam to the sample.

In a variation, Brillouin spectrometer 40 includes virtually imaged phased arrays (VIPA) 70 for measuring the Brillouin signal. In the specific design of FIG. 1, Brillouin scatter light is collected by objective 72. The Brillouin signal first went through a confocal unit 74 consisting of two lenses (L5 and L6) and an adjustable pinhole (PH) through which the Brillouin scattering out of the focal plane will be rejected. A cylindrical lens (C1) was used to couple the Brillouin beam into the VIPA etalon. A Filter was used for apodization. The output beam of the VIPA was reshaped by the cylindrical lenses C2 and C3 and then projected onto the mask. A lens pair was used to image the Brillouin spectrum onto an EMCCD.

In a variation, multimodal optical apparatus 10 further includes a drive 78 (e.g., a motor) for translating the sample, thereby allowing different points on a sample to be measured.

In a variation, multimodal optical apparatus 10 further includes a computing device 80 configured to receive Brillouin signals from the Brillouin spectrometer 40 and photoacoustic measurements from the acoustic detector 42. In a refinement, the computing device is configured to determine mechanical, optical, and acoustical properties of the sample at microscopic resolution as set forth below in more detail.

The following examples illustrate the various embodiments of the present invention. Those skilled in the art will recognize many variations that are within the spirit of the present invention and scope of the claims.

FIG. 1 shows the schematic of the multimodal PA-Brillouin microscopic imaging system. A 780-nm continuous-wave (CW) laser (DL pro, Toptica) was used as the light source for Brillouin scattering. The laser beam first went through an isolator to reject possible back-reflection. A variable ND filter was used to adjust the output power of the laser, and a halfwave plate (HWP1) was used to adjust the polarization state of the beam to be p-polarized. Using a pair of lenses (L1, f=30 mm and L2, f=150 mm), the diameter of the Brillouin beam was expanded from 2.38 mm to 11.90 mm. After passing through the second polarized beam splitter (PBS2), the mirror M1, and a half-wave plate (HWP3), the expanded laser beam was focused into the sample cell (1-cm square cuvette) by lens L3 (f=75 mm), with a focused spot of 6.26 µm. A homebuilt Brillouin spectrometer was used to collect the generated Brillouin signal at 90° geometry. The light source for PA excitation, emitted from a tunable pulsed laser (OPOTEK, Phocus Mobile), was tuned to the wavelength of 780 nm with a beam diameter of ~8 mm. Since the pulsed laser is random-polarized, a polarized beam splitter (PBS1) was used to obtain the linearly polarized beam (p-polarized). After adjusting the polarization orientation of the PA beam to s-polarized with a half-wave plate (HWP2), the PA beam was coupled into the optical path of the Brillouin beam using PBS2 and focused into the sample cell with a spot of 9.31 µm. The half-wave plate (HWP3) was used to further adjust the Brillouin beam and PA beam to s-polarized and p-polarized, respectively. Since 90° scattering geometry is sensitive to s-polarized light but has no response to p-polarized light[23], our design can generate a strong Brillouin signal while avoiding any crosstalk from the PA beam.

The generated PA signal was detected by a needle hydrophone (Onda, HNP-0400, 1-20 MHz) that was inserted into the sample cell and close to the focal point (~4 mm). Meanwhile, the Brillouin signal was measured by a virtually imaged phased arrays (VIPA)-based Brillouin spectrometer. After being collected by an objective (OBJ, 4×/0.1), the Brillouin signal first went through a confocal unit consisting of two lenses and an adjustable pinhole (L5, f=19 mm; L6, f=80; and PH: tunable pinhole), through which the Brillouin scattering out of the focal plane will be rejected. A cylindrical lens (C1, f=200 mm) was used to couple the Brillouin beam into the VIPA etalon (FSR=15 GHz, LightMachinery). A Filter (continuous ND filter, Thorlabs) was used for apodization. The output beam of the VIPA was reshaped by the cylindrical lenses C2 (f=150 mm) and C3 (f=75 mm) and then projected onto the mask. A lens pair (LP, 1:1, f=30.0 mm) was used to image the Brillouin spectrum onto an EMCCD camera (iXon, Andor). Before experiments, the spectrometer was calibrated using standard materials (i.e., water and methanol) based on established protocol [7].

Figure 2:
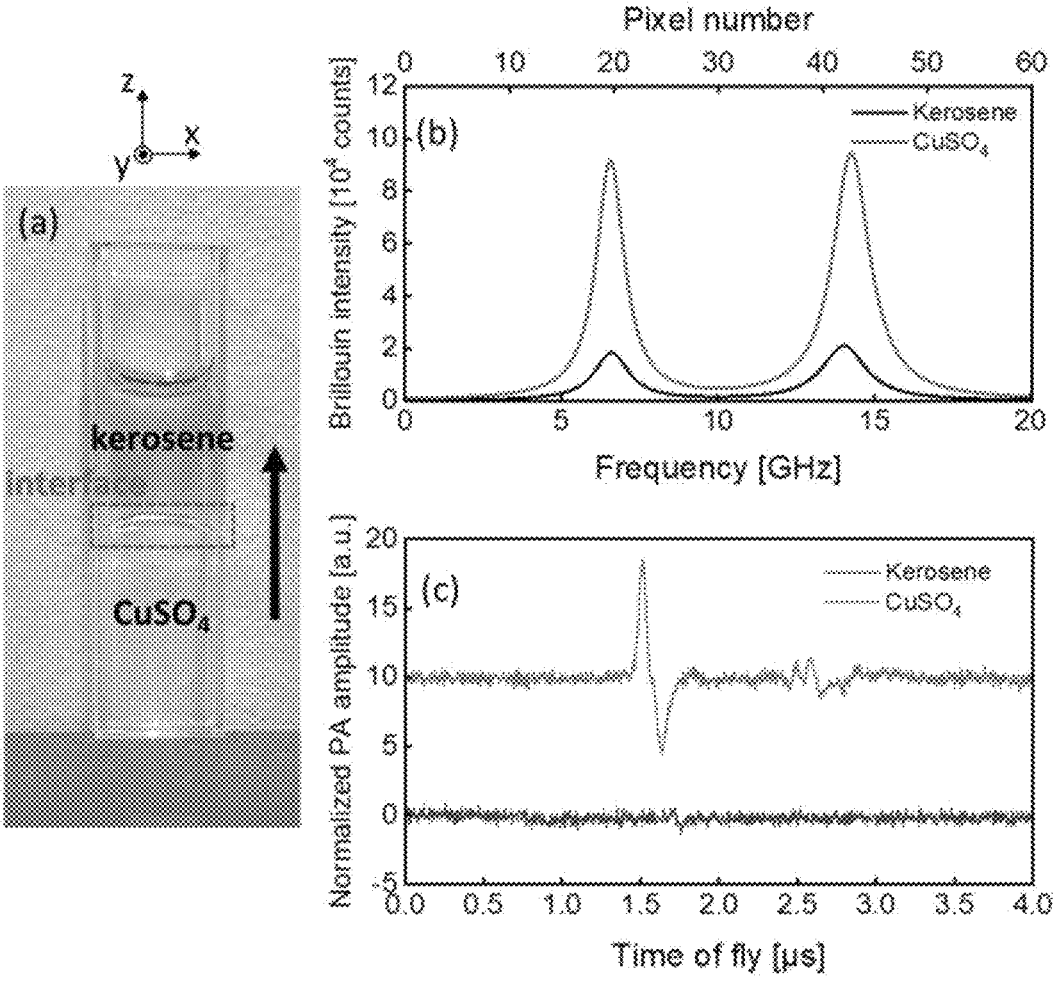
FIG. 2. (a) Photo of the stratified sample with the scan direction; and original (b) Brillouin and (c) PA signal (single measurement) of CuSO4 and kerosene.
Figure 3:
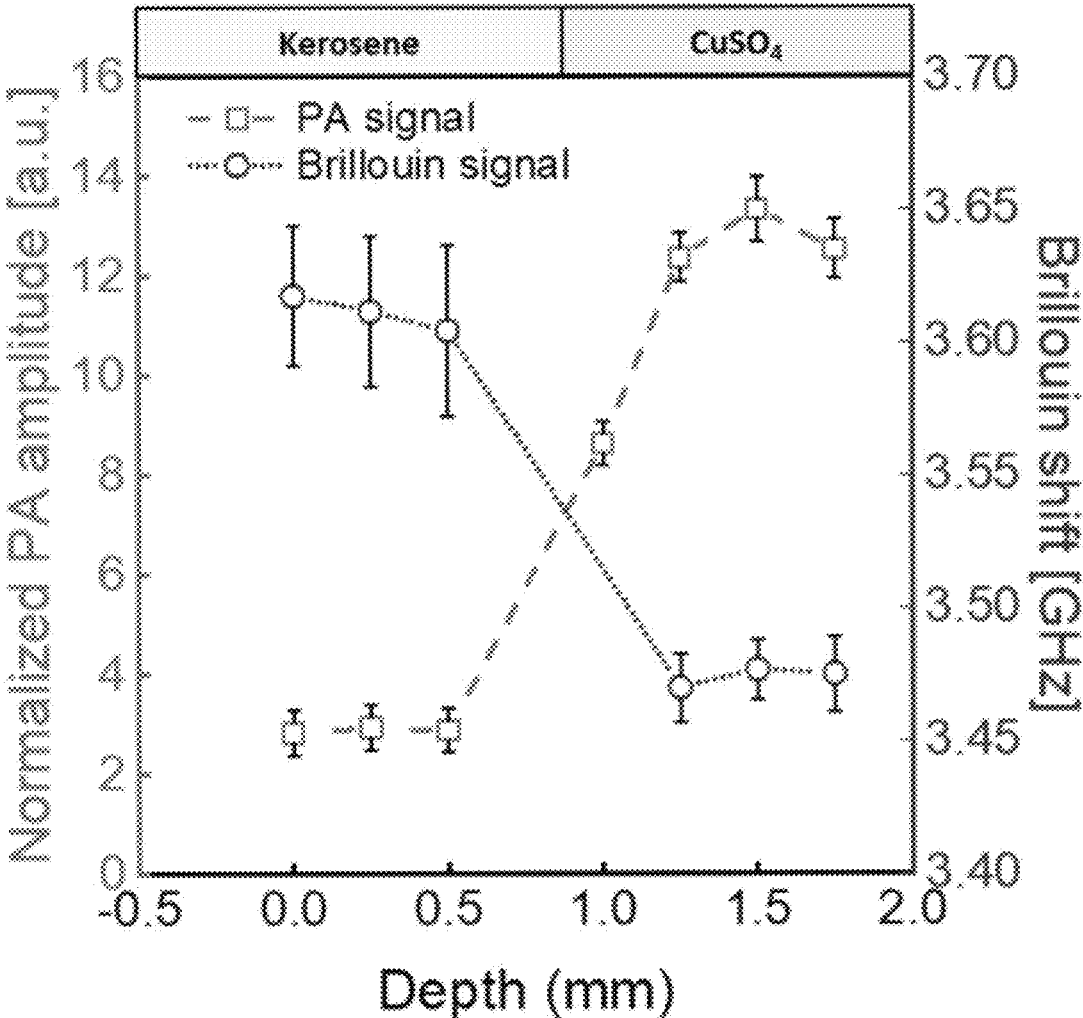
FIG. 3. Vertical 1-D profiling of the stratified $CuSO_4$-kerosene sample based on (a) Brillouin shift and (b) PA amplitude [error bars are standard deviation for 100 times measurement].

To validate the colocalization of the multimodal optical imaging system, we conducted a one-dimensional scanning of a stratified sample (FIG. 2a made of 1% copper sulfate solution ($CuSO_4$) and kerosene. For Brillouin measurement, the laser power was 27 mW at the focal plane, and the acquisition time of the spectrometer was 50 ms. For PA measurement, the average energy of the laser pulse was 1.4 mJ at a repetition rate of 10 Hz. FIGS. 2 (b) and (c) show the representative Brillouin shift and PA amplitude for $CuSO_4$ solution and kerosene, respectively. The sample cell was carried by a vertical translation stage and was scanned manually along the z direction for 1.75 mm with a step size of 0.25 mm. At each position, 100 frames of Brillouin and PA signal were collected for calculating the average Brillouin shift and PA peak-to-peak amplitude. FIG. 3 shows the colocalized Brillouin and PA signals across the interface of two materials. The same trend for Brillouin and PA curves indicates that both the Brillouin beam and PA beam share the same focal point of the setup. The increase of PA signal amplitude and the decrease of Brillouin shift at the transition zone is mainly due to the beam distortion at the curved interface of two liquids (FIG. 2(a)), and the step size is limited by the resolution of the translational stage.

Figure 4:
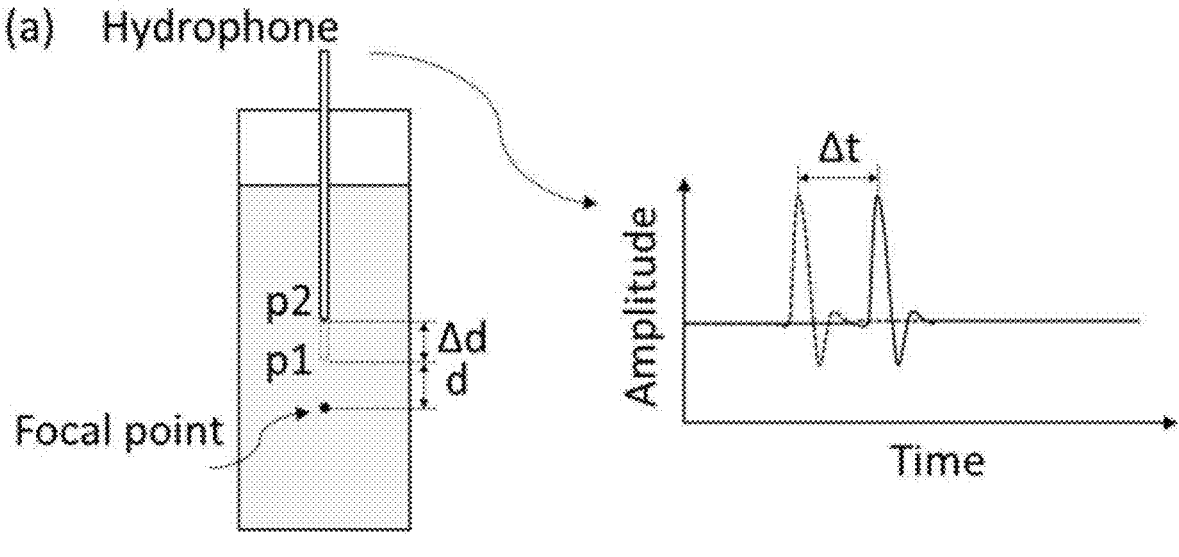
FIG. 4. (a) the schematic for measuring SOS; (b) the regression results from one measurement on 4.76% saline.
Figure 4:
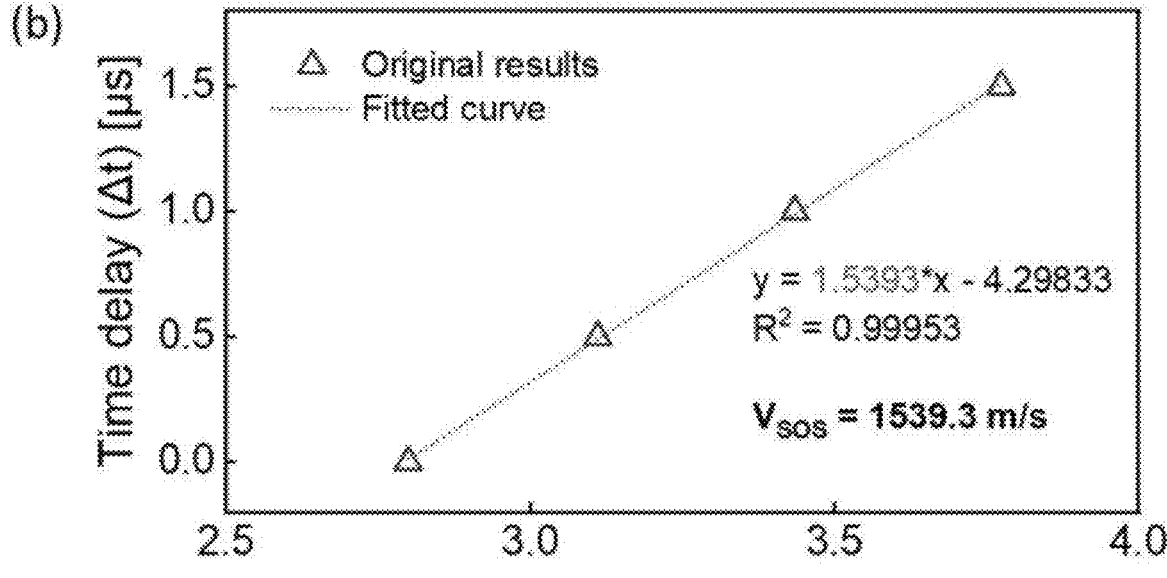

Next, we used the multimodal modality to directly measure the refractive index. To do so, we prepared three saline solutions: the weight/weight concentrations are 0% (deionized water), 4.76%, and 16.67%, respectively. The SOS ($V_{SOS}$) is directly calculated from the relative change in distance (Δd) between the focal point and the transducer as well as the corresponding time delay (Δt) (FIG. 4(a)):

$$V_{SOS} = \Delta d / \Delta t. \tag{1}$$

For each sample, the transducer was moved to four positions in sequence, with a distance of 0.25 mm in each movement (moving accuracy: ±0.02 mm). At each position, PA signal was averaged by 100 times, and the primary positive peak was used to quantify the arrival time. The value of $V_{SOS}$ was then calculated from all datasets by a linear regression with least squares method (FIG. 4 (b)).

Figure 5:
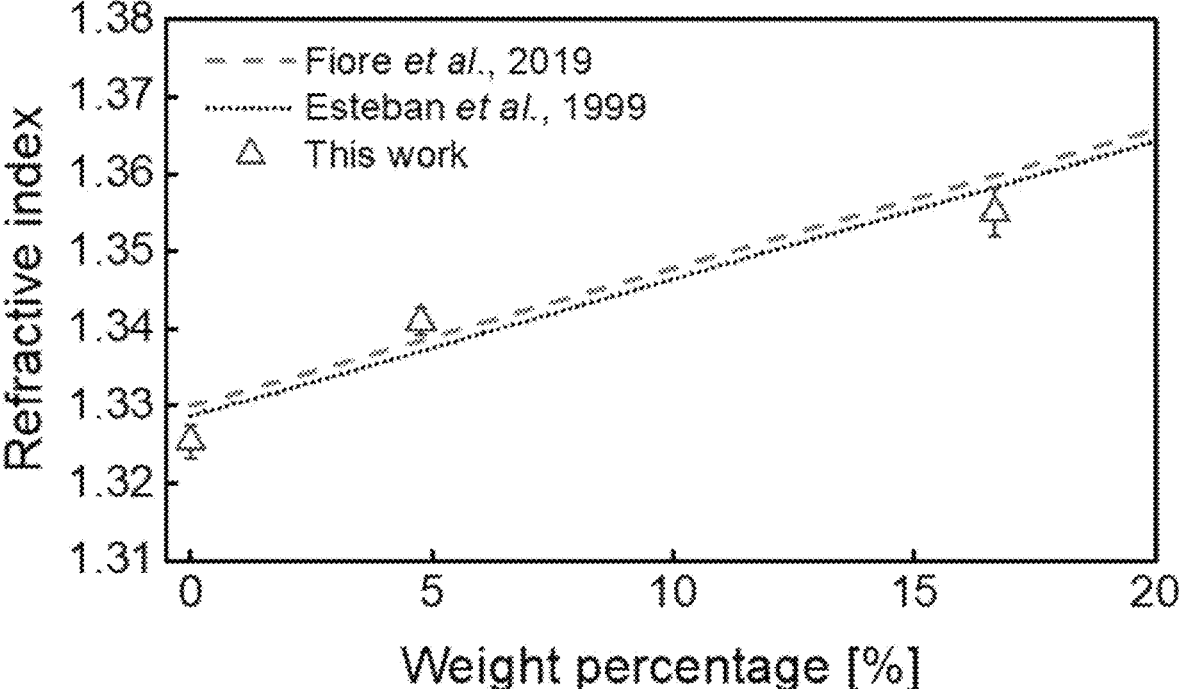
FIG. 5. Comparison with saline RI from calculation and reference [error bars are standard error for 3 times repeated experiments].

Meanwhile, Brillouin shift $\omega_B$ of the sample was calculated as described earlier. Therefore, the refractive index of the sample can be calculated by $$n = \omega_B \lambda / (\sqrt{2} V_{SOS}), \tag{2}$$

with λ=780 nm. We repeated the measurements three times for both PA and Brillouin, and the averaged value of the refractive index with the standard error of the mean were shown in FIG. 5. The measured refractive index was compared with the results from Fiore et al. using dual-geometry Brillouin spectroscopy at 532 nm and 22° C. [21] and from Esteban et al. using a fiber-optic sensor at 780 nm and 20.7° C. [24]. Taking the average of the literature data (the Fiore's data were corrected based on water's refractive index at 780 nm and 20.7° C.) as a reference, our results show a discrepancy of 0.0041 (0.31%), 0.0029 (0.22%), and 0.0042 (0.31%), respectively, suggesting a good agreement.

Since Brillouin microscopy probes the acoustic phonon at GHz frequency band while the PA signal is in the MHz band, the possible acoustic dispersion of the sample may introduce an artifact to the measured refractive index. To estimate the acoustic dispersion, we calculated the phonon velocity at GHz derived from the Brillouin measurements using the reported value of the refractive index [24] and compared it with PA measurements at MHz. The result is summarized in Table 1, where the relative discrepancy of the two datasets is within 0.4%, indicating the acoustic dispersion in our samples is neglectable. This is also consistent with several previous studies in which the SOS in pure water and saline has a variety of less than 0.3% as the frequency spans from 0.5 MHz to 1.5 GHz [25-29]. In addition, a linear behavior (no dispersion) of the sound wave has been found in many (bio)polymers [21], indicating the potential application of our multimodal modality in biomaterials and biological samples. However, for materials in which the acoustic dispersion is prominent, prior knowledge of dispersion behavior is needed for accurate measurement of the refractive index.

TABLE 1

Comparison of SOS results calculated by Brillouin and PA.

| Weight percentage | Brillouin results [m/s] @3.6 GHz | PA fitting results [m/s] @1-20 MHz |
|---|---|---|
| 0% | 1484.02 ± 2.33 | 1480.80 ± 0.54 |
| 4.76% | 1541.02 ± 0.60 | 1534.84 ± 1.87 |
| 16.67% | 1675.13 ± 3.40 | 1669.95 ± 1.81 |

Here we used a homogenous sample for validating the feasibility of refractive index measurement. In fact, our modality can also be used for inhomogeneous samples. Take multilayer sample as an example, the thickness of each layer can be first obtained from Brillouin results. While keeping the transducer still, the movement of the beam spot into different layers will introduce the time delay to the PA signal, which is a function of SOS for each layer. Therefore, the SOS of each layer can be derived by solving a set of multivariate equations. Together with the acquired Brillouin image, the refractive index of each layer can be measured. In addition, current setup utilized two separate laser sources for generating Brillouin and PA signals. Alternatively, a single laser source could be used for achieving the same function in case a pulse laser with narrow linewidth and short pulse width is available. In the present work, the optical setup was demonstrated in transmission mode. It can be easily modified into reflection mode by integrating with the existing designs of inverted confocal Brillouin microscopy and PA microscopy [30], allowing better accessibility for biomedical applications.

In summary, a versatile multimodal optical imaging modality based on Brillouin microscopy and PA imaging is provided. The integrated system with a shared focal point for both Brillouin and PA beam was designed to simultaneously obtain samples' mechanical, optical, and acoustical properties. Furthermore, the integrated system can directly probe the sample's refractive index, which is not available by each individual technique. Therefore, the proposed versatile multimodal Brillouin and PA imaging system has the potential to provide quantitative measurements of multiple parameters for biomedical research.

Additional details of the invention are provided in Chenjun Shi, Yan Yan, Mohammad Mehrmohammadi, and Jitao Zhang, "Versatile multimodal modality based on Brillouin light scattering and the photoacoustic effect," Opt. Lett. 48, 3427-3430 (2023); and in Shi C, Yan Y. Mehrmohammadi M. Zhang J A versatile multimodal optical modality based on Brillouin light scatteinng and photoacoustic effect, bioRxiv [Preprint]. 2023 March 12:2023.03.10.532144. doi: 10.1101/2023.03.10.532144. Update in: Opt Lett. 2023 Jul. 1; 48(13):3427-3430. PMID: 36945550; PMCID: PMC10028970; the entire disclosures of which are hereby incorporated by reference in their entirety.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

[1] A. G. Bell, "The photophone," *Science*, no. 11, pp. 130-134, 1880.

[2] A. Rosencwaig and A. Gersho, "Theory of the photoacoustic effect with solids," *Journal of Applied Physics*, vol. 47, no. 1, pp. 64-69, 1976.

[3] M. Xu and L. V. Wang, "Photoacoustic imaging in biomedicine," *Review of scientific instruments*, vol. 77, no. 4, p. 041101, 2006.

[4] G. Scarcelli and S. H. J. N. p. Yun, "Confocal Brillouin microscopy for three-dimensional mechanical imaging," vol. 2, no. 1, pp. 39-43, 2008.

[5] G. Scarcelli et al., "Noncontact three-dimensional mapping of intracellular hydromechanical properties by Brillouin microscopy," *Nature methods*, vol. 12, no. 12, pp. 1132-1134, 2015.

[6] R. Prevedel, A. Diz-Muñoz, G. Ruocco, and G. Antonacci, "Brillouin microscopy: an emerging tool for mechanobiology," *Nature methods*, vol. 16, no. 10, pp. 969-977, 2019.

[7] J. Zhang and G. Scarcelli, "Mapping mechanical properties of biological materials via an add-on Brillouin module to confocal microscopes," *Nature protocols*, vol. 16, no. 2, pp. 1251-1275, 2021.

[8] J. G. Dil, "Brillouin scattering in condensed matter," *Reports on Progress in Physics*, vol. 45, no. 3, p. 285, 1982.

[9] M. Nikolić, C. Conrad, J. Zhang, and G. Scarcelli, "Noninvasive Imaging: Brillouin Confocal Microscopy,"

in *Biomechanics in Oncology*, C. Dong, N. Zahir, and K. Konstantopoulos, Eds. Cham: Springer International Publishing, 2018, pp. 351-364.

[10] G. Antonacci et al., "Recent progress and current opinions in Brillouin microscopy for life science applications," *Biophysical Reviews*, vol. 12, pp. 615-624, 2020.

[11] C. Poon, J. Chou, M. Cortie, and I. Kabakova, "Brillouin imaging for studies of micromechanics in biology and biomedicine: from current state-of-the-art to future clinical translation," *Journal of Physics: Photonics*, vol. 3, no. 1, p. 012002, 2020.

[12] F. Palombo and D. Fioretto, "Brillouin light scattering: applications in biomedical sciences," *Chemical reviews*, vol. 119, no. 13, pp. 7833-7847, 2019.

[13] G. Scarcelli, P. Kim, and S. H. Yun, "In vivo measurement of age-related stiffening in the crystalline lens by Brillouin optical microscopy," *Biophysical journal*, vol. 101, no. 6, pp. 1539-1545, 2011.

[14] G. Scarcelli, R. Pineda, and S. H. Yun, "Brillouin optical microscopy for corneal biomechanics," *Investigative ophthalmology & visual science*, vol. 53, no. 1, pp. 185-190, 2012.

[15] G. Antonacci and S. Braakman, "Biomechanics of subcellular structures by non-invasive Brillouin microscopy," *Scientific Reports*, vol. 6, no. 1, p. 37217, 2016.

[16] J. Zhang et al., "Tissue biomechanics during cranial neural tube closure measured by Brillouin microscopy and optical coherence tomography," *Birth defects research*, vol. 111, no. 14, pp. 991-998, 2019.

[17] J. Zhang et al., "Nuclear mechanics within intact cells is regulated by cytoskeletal network and internal nanostructures," *Small*, vol. 16, no. 18, p. 1907688, 2020.

[18] R. Barer, K. F. A. Ross, and S. Tkaczyk, "Refractometry of living cells," *Nature*, vol. 171, no. 4356, pp. 720-724, 1953.

[19] M. Schürmann, J. Scholze, P. Müller, J. Guck, and C. J. Chan, "Cell nuclei have lower refractive index and mass density than cytoplasm," *Journal of biophotonics*, vol. 9, no. 10, pp. 1068-1076, 2016.

[20] M. Bailey et al., "Viscoelastic properties of biopolymer hydrogels determined by Brillouin spectroscopy: A probe of tissue micromechanics," *Science advances*, vol. 6, no. 44, p. eabc1937, 2020.

[21] A. Fiore, C. Bevilacqua, and G. Scarcelli, "Direct three-dimensional measurement of refractive index via dual photon-phonon scattering," *Physical review letters*, vol. 122, no. 10, p. 103901, 2019.

[22] R. Schlüßler et al., "Correlative all-optical quantification of mass density and mechanics of subcellular compartments with fluorescence specificity," *Elife*, vol. 11, p. e68490, 2022.

[23] R. W. Boyd, *Nonlinear optics*. Academic press, 2020.

[24] O. Esteban, M. Cruz-Navarrete, A. González-Cano, and E. Bernabeu, "Measurement of the degree of salinity of water with a fiber-optic sensor," *Applied optics*, vol. 38, no. 25, pp. 5267-5271, 1999.

[25] C. L. O'Connor and J. P. Schlupf, "Brillouin scattering in water: the Landau-Placzek ratio," *The Journal of Chemical Physics*, vol. 47, no. 1, pp. 31-38, 1967.

[26] V. A. Del Grosso and C. W. Mader, "Speed of sound in pure water," *the Journal of the Acoustical Society of America*, vol. 52, no. 5B, pp. 1442-1446, 1972.

[27] P.-K. Choi and K. Takagi, "Ultrasonic velocity and absorption in water up to 1.5 GHz," *Japanese Journal of Applied Physics*, vol. 22, no. 5R, p. 890, 1983.

[28] K. i. Fujii and R. Masui, "Accurate measurements of the sound velocity in pure water by combining a coherent phase-detection technique and a variable path-length interferometer," *The Journal of the Acoustical Society of America*, vol. 93, no. 1, pp. 276-282, 1993.

[29] D. Liu, J. Xu, R. Li, R. Dai, and W. Gong, "Measurements of sound speed in the water by Brillouin scattering using pulsed Nd: YAG laser," *Optics communications*, vol. 203, no. 3-6, pp. 335-340, 2002.

[30] J. Yao and L. V. Wang, "Photoacoustic microscopy," *Laser & photonics reviews*, vol. 7, no. 5, pp. 758-778, 2013.

What is claimed is:

1. A multimodal optical apparatus for imaging a sample to provide comprehensive mechanical properties, the multimodal optical apparatus comprising:

a sample cell that holds the sample;

a first light source for providing a Brillouin light beam to the sample for Brillouin scattering;

a first optical system for directing and modifying the Brillouin light beam, the first optical system providing a p-polarized light beam to the sample;

a second light source for providing a photoacoustic light beam to the sample for photoacoustic excitation;

a second optical system for directing and modifying the photoacoustic light beam, the second optical system providing a s-polarized light beam to the sample;

a third optical system for coupling the Brillouin light beam to the photoacoustic light beam as a coupled light beam after the first optical system and the second optical system, the third optical system directing the coupled light beam to the sample;

a Brillouin spectrometer for collecting a Brillouin signal generated from the sample; and an acoustic detector for detecting a photoacoustic signal generated from the sample.

2. The multimodal optical apparatus of claim 1 wherein the Brillouin spectrometer collects the Brillouin signal at a 90° geometry.

3. The multimodal optical apparatus of claim 1 wherein the acoustic detector is a hydrophone or a microphone.

4. The multimodal optical apparatus of claim 1 wherein the first optical system comprises:

an isolator to reject back-reflection;

a variable neutral density filter adjusting output power of the first light source;

a halfwave plate (HWP1) for adjusting polarization state of the Brillouin light beam to be p-polarized; and a lens system for expanding the Brillouin light beam.

5. The multimodal optical apparatus of claim 4, wherein the lens system includes a pair of lenses.

6. The multimodal optical apparatus of claim 1, wherein the first light source is a continuous wave laser.

7. The multimodal optical apparatus of claim 1 wherein the second light source is a tunable pulsed laser.

8. The multimodal optical apparatus of claim 1, wherein the second optical system includes a polarized beam splitter (PBS1) to obtain a linearly polarized beam and a half-wave plate (HWP2) for adjusting polarization orientation of the photoacoustic light beam to s-polarization.

9. The multimodal optical apparatus of claim 1, wherein the third optical system includes a polarized beam splitter (PBS2) that couples the Brillouin light beam to the photoacoustic light beam.

10. The multimodal optical apparatus of claim 9, wherein the third optical system includes a half-wave plate (HWP3) to further adjust the Brillouin light beam and PA beam to s-polarized and p-polarized, respectively.

11. The multimodal optical apparatus of claim 1, wherein the third optical system includes a mirror M1 for directing the coupled light beam to the sample.

12. The multimodal optical apparatus of claim 1, wherein the Brillouin spectrometer includes virtually imaged phased arrays (VIPA) for measuring the Brillouin signal.

13. The multimodal optical apparatus of claim 1, wherein the sample is a biological sample.

14. The multimodal optical apparatus of claim 1, further comprising a computing device configured to receive Brillouin signals from the Brillouin spectrometer and photoacoustic measurements from the acoustic detector.

15. The multimodal optical apparatus of claim 14, wherein the computing device is configured to determine mechanical, optical, and acoustical properties of the sample at microscopic resolution.

16. A multimodal optical apparatus for imaging a sample to provide comprehensive mechanical properties, the multimodal optical apparatus comprising:

a sample cell that holds the sample;

a first light source for providing a Brillouin light beam to the sample for Brillouin scattering;

a first optical system for directing and modifying the Brillouin light beam, the first optical system providing a p-polarized light beam to the sample;

a second light source comprising a pulsed laser for providing a photoacoustic light beam to the sample for photoacoustic excitation;

a second optical system for directing and modifying the photoacoustic light beam, the second optical system providing a s-polarized light beam to the sample;

a third optical system for coupling the Brillouin light beam to the photoacoustic light beam as a coupled light beam after the first optical system and the second optical system, the third optical system directing the coupled light beam to the sample;

a Brillouin spectrometer for collecting a Brillouin signal generated from the sample; and an acoustic detector for detecting a photoacoustic signal generated from the sample, wherein the photoacoustic signal comprises acoustic waves induced by thermoelastic expansion in the sample.

* * * * *